United States Patent Office 3,539,479
Patented Nov. 10, 1970

3,539,479
METHOD FOR IMPROVING THE CURE RATE OF POLYESTERS
Robert A. Alberts, Sinking Spring, Pa., assignor to SCM Corporation, Cleveland, Ohio, a corporation of New York
No Drawing. Filed Feb. 4, 1969, Ser. No. 796,554
Int. Cl. C08f *21/00;* C08g *17/14*
U.S. Cl. 260—22
6 Claims

ABSTRACT OF THE DISCLOSURE

This invention relates to an improvement in a process for curing copolymerizable compositions. More specifically, it relates to a method of accelerating the rate of cure of such copolymerizable compositions, which component comprises a thermosettable polyester resin component and an unsaturated monomer component by adding from about 0.1% to about 3.5% of a lithium salt which is soluble in at least one component of the copolymerizable composition by weight of the composition prior to curing. Cure times and also gel times can be reduced as much as 35%.

---

Lithium halides have been shown to stabilize unsaturated polyester resins during storage. On the addition of free radical producing catalyst, such lithium halides have been noted to slightly accelerate the rate of cure.

This invention contemplates adding lithium salts, which are more highly soluble in the resinous composition, to such composition, rather than the comparatively insoluble salts such as the halides. One advantage of the invention is that substantially reduced cure and gel times for polyesters are obtained with the more soluble lithium salts whereas only slightly improved cure and gel times are obtained with relatively insoluble lithium salts. The differences in cure and gel times recorded for the contrasting lithium salts may be as much as 30% to 50% in some cases. Another advantage is that the more soluble lithium salts impart a bleaching effect to the composition and produces a desirably lighter colored resin product than relatively insoluble lithium salts.

Broadly, the invention relates to an improvement in a process for curing copolymerizable compositions comprising at least one unsaturated polyester resin component and at least one unsaturated component crosslinkable therewith. The improvement lies in the finding that lithium salts which are substantially soluble in at least one of the components of the copolymerizable composition or in an organic carrier compatible therewith, such as a plasticizer or inert hydrocarbon, act during the free radical catalysis of the composition to substantially accelerate the rate of cure of said composition, said carrier itself being substantially soluble in at least one of the components of said copolymerizable composition.

The term "thermoset polyester resin," as used herein, refers to a substantially fully cured polyester resin formed by the polymerization of the copolymerizable composition. "Curing" is the process wherein the resin converts from the liquid to solid form. "Fully cured" refers to the condition wherein the resin is substantially crosslinked and in the solid and infusible form.

The term "thermosettable polyester resin" refers to the product of an esterification reaction between at least one unsaturated polycarboxylic acid (or anhydride thereof) and at least one polyhydric alcohol. Typical polycarboxylic acids include maleic, phthalic (iso and ortho), fumaric, mesaconic, citraconic, and glutaconic acids. Typical anhydrides are maleic and phthalic. Typical polyhydric alcohols are usually glycols such as diethylene glycol, trimethylene glycol, propylene glycol, and ethylene glycol.

The unsaturated component crosslinkable with the thermosettable polyester resin previously defined generally is a vinyl monomer for efficiency and economy, but can comprise other compounds having carbon-carbon unsaturation and even low molecular weight polymers. Curing of the composition usually results in a tough, hard, durable, solvent-resistant and substantially infusible product. If the components are not properly crosslinked, they are deficient in these characteristic properties. Preferred unsaturated monomers include styrene, butadiene, methylstyrene, acrylic acid, and methylmethacrylate.

The copolymerizable composition can contain an organic carrier for the soluble lithium salt, e.g., a plasticizer or nonreactive hydrocarbon. Such carrier, however, must be soluble in the concentration used in at least one of the components of the copolymerizable composition and furthermore, such lithium salt must be dissolved in the carrier. The solubility of the carrier in at least one of the components of the copolymerizable composition is necessary in order to provide a relatively uniform distribution of such lithium salt in the copolymerizable composition. Typical useful carriers include glycols such as propylene glycol, conventional polyester plasticizers such as dioctyl phthalate, xylene or other hydrocarbons which can be driven from the composition before its curing, etc.

By substantially soluble I mean that at least 10 grams of the lithium salt, and preferably at least 30 grams, should dissolve in at least 100 grams of at least one of the components of the copolymerizable composition or in the organic carrier at room temperature (75° F.). Lithium salts which do not satisfy this solubility requirement might produce a slight accelerative effect in the rate of cure, but do not yield the favorable results obtained by the more soluble lithium salts. This is specifically brought out in Example 3 wherein lithium chloride was compared to more soluble organic salts for gel time determination tests. Preferred lithium salts are lithium decanoate and lithium thiocyanate. Other useful lithium salts include lithium acrylate, lithium methacrylate and lithium soaps of unsaturated and saturated aliphatic carboxylic acids in general.

In practicing the invention, I use a sufficient amount of the soluble lithium salt to produce a substantial acceleration in the rate of cure of the copolymerizable composition. By substantial acceleration I mean that the time of cure of such composition should be decreased by a noticeable amount (at least about 20%), or the gel time should be reduced by about 15%, based on the cure time or gel time of a corresponding composition without such lithium. For example, normal cure times in some polyester resins can be as much as 6 hours, but when a soluble lithium salt is added to the composition in accordance with this invention and in the presence of a free radical producing catalyst, the cure time can be reduced as much as 2 hours or more. The amount of soluble lithium salt that usually is added to increase the cure rate or reduce the gel time can be from about 0.1% to about 3.5%, based on the weight of the polymerizable composition, or, on a lithium metal basis, between about 0.005%–0.5%. Preferably, the lithium as metal should be between about 0.005% and about 0.15% based on the weight of the copolymerizable composition for efficiency and economy. When the amount of lithium salt exceeds about 3.5%, an adverse effect on the color and other properties of the resin is usually noted. However, accelerative effects are observed.

It is important to note that the soluble lithium salt in the absence of free radical catalysis does not accelerate the rate of cure of the copolymerizable composition. Typical free radical producing catalysts are various redox systems, high energy electron beams, and benzoyl peroxide, methyl ethyl ketone peroxide, and cumene hydroperoxide. Conventional amounts of such catalyst are about 0.5%–2% by weight of the copolymerizable composition.

Two tests have been used and referred to in the examples to illustrate the effect of the lithium salts on the time of cure for polyester resins. A brief explanation of these tests is as follows:

CURE TIME

Briefly, this test involves a comparison of the time required for the copolymerizable composition to cure with conventional catalysts and accelerators vs. the time required for the copolymerizable composition to cure with a substituted accelerator or catalyst. In this case, the soluble lithium salt is the substituted accelerator. The curing of the copolymerizable composition is conducted at room temperature of from about 65–75° F.

GEL TIME DETERMINATION

Several gel time determination tests are known and used in the art. The test used and referred to in this application is referred to as a room temperature gel time and is based on a measurement of the time required for the copolymerizable composition to convert from a liquid to a "gelled state," which is similar in physical properties to gelatin. The test is conducted at room temperature of about 75° F.

The following examples are shown as a preferred way of practicing this invention but should not be construed as limiting it. All parts are parts by weight and all percentages are expressed as weight percentages.

EXAMPLE 1

Fifty parts of an orthophthalic acid unsaturated polyester resin component was added to 50 parts styrene monomer and mixed, forming a copolymerizable composition. The resultant composition then was divided into two portions, both portions being catalyzed with 2% by weight of a 60% mixture of methyl ethyl ketone peroxide. To one portion 0.4% basis the weight of the composition of a lithium decanoate solution was mixed in. The lithium decanoate solution contained 2% lithium (as metal) in decanoic acid vehicle. The other portion had no such addition of lithium salt. The portion promoted by the lithium salt had a gel time of 10 minutes, whereas the portion having no lithium salt addition had a gel time of 23 minutes.

EXAMPLE 2

A first solution was prepared by adding twenty parts of lithium acetate to 80 parts propylene glycol and mixed. A second solution was prepared by adding 10 parts lithium thiocyanate to 90 parts propylene glycol and mixed. A third solution was the same lithium solution as used in Example 1. A highly reactive conventional orthophthalic unsaturated polyester resin component in vinyl monomer forming a copolymerizable composition was divided into 4 equal portions. Each composition was promoted with 1.2 parts cobalt octoate and catalyzed with one part methyl ethyl ketone peroxide. The following table shows the gel time and casting appearance for the resulting products when treated with the described lithium salt solutions as compared to the resin portion having no such addition.

| Number | Lithium compound (basis weight of copolymerizable composition) | Gel time, min. | Casting appearance |
|---|---|---|---|
| 1 | None | 14.5 | Crazed. |
| 2 | 0.4% (lithium decanoate) | 9.3 | Craze-free. |
| 3 | 0.6% lithium acetate | 9.5 | Crazed. |
| 4 | 0.65% lithium thiocyanate | 12.4 | Craze-free. |

The above table shows that soluble lithium salts reduced the gel time of the copolymerizable composition by as much as 40% as compared to a copolymerizable composition having no such lithium salt.

EXAMPLE 3

A conventional unsaturated polyester resin component of propylene glycol, maleic anhydride, isophthalic acid and diethylene glycol in a styrene monomer forming a copolymerizable composition was treated with 0.1% by weight of a 12% solution of cobalt octoate and 1% methyl ethyl ketone peroxide. This resulting composition was divided into 3 equal portions; the first portion having no additional ingredients; the second portion was mixed with a lithium decanoate solution furnishing 0.5% lithium as metal by weight of the composition; and the third portion was mixed with a 10% solution of lithium chloride and water furnishing 0.7% lithium chloride by weight of the composition. Attempts to solubilize 10 grams of lithium chloride in 90 grams of diallyl phthalate and propylene glycol was of no avail. These resin portions then were tested for gel times and casting appearance. The results are shown in the following table:

| Composition | Gel time, min. | Casting appearance |
|---|---|---|
| Copolymerizable composition plus 0.1% by weight of 12% cobalt octoate, no addition of lithium salt. | 40 | Reddish brown. |
| Copolymerizable composition plus 0.1% by weight of 12% cobalt octoate plus 0.5% lithium decanoate based on the weight of copolymerizable composition. | 27 | Lighter than above (light brown). |
| Copolymerizable composition plus 0.1% by weight of 12% cobalt octoate plus 0.7% lithium chloride based on the weight of the copolymerizable composition. | 37 | Yellow-green (hazy). |

The above table shows that the soluble lithium salt, i.e., lithium decanoate, substantially reduces the gel time from that of a resin having no additional ingredients or of a resin having an insoluble lithium chloride solution as the accelerator. In addition, the resin having the lithium decanoate therein produced a cured resin composition which was lighter than those cured without the addition of a soluble lithium salt.

What is claimed is:

1. In the process of curing a copolymerizable composition comprising at least one unsaturated polyester resin component and at least one unsaturated component copolymerizable therewith under the action of free radical catalysis to yield a thermoset polyester resin, the improvement which comprises: dissolving in said copolymerizable composition a sufficient amount of a lithium salt, not substantially in excess of about 3.5% by weight thereof, to substantially accelerate the rate of cure of said copolymerizable composition, said lithium salt being substantially soluble directly in said copolymerizable composition or in an organic carrier which is soluble in said copolymerizable composition.

2. The process of claim 1 wherein said soluble lithium salt is the lithium salt of a fatty acid having from about 8 to about 20 carbon atoms.

3. The process of claim 2 wherein said soluble lithium salt is lithium decanoate.

4. The process of claim 1 wherein said soluble lithium salt is lithium thiocyanate.

5. The process of claim 1 wherein said amount of lithium salt is equivalent to about 0.005% to 0.15% lithium as metal by weight of said thermoset polyester resin.

6. The process of claim 1 wherein said carrier is a plasticizer.

References Cited

UNITED STATES PATENTS

| | | | |
|---|---|---|---|
| 2,695,910 | 11/1954 | Asseff et al. | 260—413 |
| 2,720,502 | 10/1955 | Caldwell | 260—22 |
| 3,002,942 | 10/1961 | Zoetbrood et al. | 260—22 |
| 3,055,869 | 9/1962 | Wilson et al. | 260—22 |
| 3,061,580 | 10/1962 | Erickson et al. | 260—45.75 |

FOREIGN PATENTS 1,130,121  10/1968  Great Britain.

OTHER REFERENCES

Chemical Abstracts, vol. 63, No. 10, Nov. 8, 1965, p. 13,524E.

Chemical Abstracts, vol. 65, No. 13, Dec. 19, 1966, p. 20368g.

DONALD E. CZAJA, Primary Examiner

R. W. GRIFFIN, Assistant Examiner

U.S. Cl. X.R.

260—31.8, 33.4, 33.6, 861, 864, 865